(12) United States Patent
Black

(10) Patent No.: US 6,397,070 B1
(45) Date of Patent: May 28, 2002

(54) METHOD AND APPARATUS FOR ESTIMATING REVERSE LINK LOADING IN A WIRELESS COMMUNICATION SYSTEM

(75) Inventor: Peter J. Black, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/358,088

(22) Filed: Jul. 21, 1999

(51) Int. Cl.[7] .............................. H04Q 7/20; H04B 1/00; H04B 1/02
(52) U.S. Cl. ........................ 455/453; 455/69; 455/70; 455/92; 370/335
(58) Field of Search .................... 455/446, 453, 455/67.1, 67.3, 522, 69, 70, 92, 302, 307, 296; 370/249, 335, 342, 331, 332; 333/167, 174, 176, 178, 181, 182, 207, 208

(56) References Cited

U.S. PATENT DOCUMENTS

| | | | | |
|---|---|---|---|---|
| 3,577,080 A | * | 5/1971 | Cannalte ................ | 455/92 X |
| 4,225,976 A | | 9/1980 | Osborne et la. ........... | 455/226 |
| 4,901,307 A | | 2/1990 | Gilhousen et al. .......... | 370/18 |
| 5,103,459 A | | 4/1992 | Gilhousen et al. .......... | 375/1 |
| 5,448,600 A | | 9/1995 | Lucas ................... | 375/205 |
| 5,548,812 A | | 8/1996 | Padovani et al. ......... | 455/33.2 |
| 5,559,790 A | | 9/1996 | Yano et al. .............. | 370/18 |
| 5,754,533 A | | 5/1998 | Bender et al. ........... | 370/252 |
| 5,839,056 A | * | 11/1998 | Hakkinen ................ | 455/69 |
| 5,859,383 A | * | 1/1999 | Soliman ................ | 370/249 |
| 6,044,072 A | * | 3/2000 | Ueda .................. | 370/335 |
| 6,061,339 A | * | 5/2000 | Nieczyporowicz et al. | 370/335 |
| 6,101,179 A | * | 8/2000 | Soliman ................. | 370/342 |
| 6,173,187 B1 | * | 1/2001 | Salonaho et al. .......... | 455/453 |
| 6,192,249 B1 | * | 2/2001 | Padovani ............... | 455/453 |
| 6,212,364 B1 | * | 4/2001 | Park ..................... | 455/69 |
| 6,216,006 B1 | * | 4/2001 | Scholefield et al. ..... | 455/453 X |
| 6,226,529 B1 | * | 5/2001 | Bruno et al. .............. | 455/557 |

FOREIGN PATENT DOCUMENTS

| | | |
|---|---|---|
| EP | 0668662 | 8/1995 |
| EP | 0673125 | 9/1995 |
| WO | 9824198 | 6/1998 |

OTHER PUBLICATIONS

Roberto Padovani, "The Application of Spread Spectrum to PCS has Become a Reality Reverse Link Performance of IS–95 Based Cellular Systems," IEEE Personal Communication, US, IEEE Communications Society, vol. 1, No. 3, Jul. 1, 1994, pp. 28–34.

* cited by examiner

Primary Examiner—Tracy Legree
(74) Attorney, Agent, or Firm—Philip Wadsworth; Kent D. Baker; Pavel Kalousek

(57) ABSTRACT

Method and apparatus for estimating reverse link loading in a wireless communication system. In the present invention, the reverse link signals are passed through notch filters such that no energy (or energy of negligible amounts) is transmitted in these areas of the reverse link frequency band. At the base station, the unloaded cell energy is estimated by measuring the energy in the areas where the reverse link signals are notched. The in band energy is then compared to the energy in the notched portions of the reverse link band and based on this ratio cell capacity is determined.

57 Claims, 6 Drawing Sheets

METHOD AND APPARATUS FOR ESTIMATING REVERSE LINK LOADING IN A WIRELESS COMMUNICATION SYSTEM

BACKGROUND OF THE INVENTION

I. Field of the Invention

The present invention relates to communications. More particularly, the present invention relates to a novel and improved method and apparatus for estimating reverse link loading in a wireless communication system.

II. Description of the Related Art

If a minimum acceptable signal quality is specified, an upper bound on the number of simultaneous users, which can communicate through a base station can be calculated. This upper bound is commonly referred to as the pole capacity of a system. The ratio of the actual number of users to the pole capacity is defined as the loading of the system. As the number of actual users approaches the pole capacity, loading approaches unity. A loading dose to unity implies potentially unstable behavior of the system. Unstable behavior can lead to degraded performance in terms of voice quality, high error rates, failed handoffs, and dropped calls. In addition, as loading approaches unity, the size of the coverage area of the base station shrinks so that users on the outer edge of the no-load coverage area are no longer able to transmit sufficient power to communicate with the base station at an acceptable signal quality.

For these reasons, it is advantageous to limit the number of users that access the system so that loading does not exceed a specified percentage of the pole capacity. One way to limit the loading of the system is to deny access to the system once the loading of the system has reached a pre-determined level. For example, if the loading increases above 70% of the pole capacity, it is advantageous to deny requests for additional connection originations, and to refrain from accepting hand-off of existing connections.

In order to limit the loading on the reverse link to a specified level, it is necessary to measure the reverse link loading. Reverse link loading of a base station is not solely a function of the number of remote units that are operating within the coverage area of the base station. Reverse link loading is also a function of interference from other sources. The front-end noise of the base station itself is a significant source of interference. In addition, other remote units operating on the same frequency within the coverage area of nearby base stations may contribute significant interference.

One means by which the reverse link loading can be measured is by averaging the measured signal to interference operation point of all active connections within the coverage area. This approach has several drawbacks. The signal to interference operation statistics of the active connections provide an indication of system performance. However, they do not provide any information concerning the amount of interference from remote units located in the coverage area of other base stations. In addition, when a remote unit is in soft hand-off between two or more base stations, it is likely that the actual signal to interference ratio at which the reverse link signal is received at any one base station is significantly beneath the signal to interference ratio set point determined by the system, thus, falsely indicating an extremely high loading level. For these reasons, measuring the average signal to interference operation point of all active connections within a base station does not provide an accurate measure of reverse link loading.

A second and simple means of determining reverse link loading is to simply count the number of active users in the base station. However, because the level of interference from other sources significantly affects loading, it should be clear that the number of users is not necessarily a good indication of reverse link loading. In addition, the effects of soft hand-off greatly decrease the correlation between the number of active users and the actual loading at the base station.

A third means of estimating the reverse link loading is to attempt to derive the reverse link loading based upon an estimate of the forward link loading. However, in a typical system the forward and reverse links do not operate at the same frequencies. Consequently, the interference from the coverage areas of adjacent base stations can be different on the forward link than on the reverse link. In addition, the effects of fading are independent as between the forward and reverse links. Furthermore, loading is a function of a data rate of a particular user. Therefore, the forward link performance is not perfectly correlated with reverse link performance.

If one of these inaccurate methods of estimating the reverse link loading is used, the system cannot accurately determine whether connection blockage is necessary. If calls are blocked unnecessarily, the capacity of the system is unnecessarily decreased. On the other hand, if the loading is permitted to approach the pole capacity, the probability of dropping a significant number of active connections increases. For this reason, it is important to have an accurate estimation of the reverse link loading.

In his book entitled "CDMA: Principles of Spread Spectrum Communication" (Addison-Wesley Wireless Communications, 1995), Dr. Andrew J. Viterbi defines reverse link loading as a function of the total received power perceived at the base station receiver. The reverse link loading X is directly related to the total power received by the base station according to the following formula:

$$\frac{P_a}{P_n} = \frac{1}{1-X} \quad (1)$$

where:
- $P_a$ is the actual power received at the base station;
- $P_n$ is the power received at no external loading (e.g. the power due to the thermal noise floor of the base station); and
- X is the reverse link loading in terms of the ratio of actual loading to pole capacity.

Or equivalently, expressed in terms of X, Equation 1 takes on the following expression:

$$X = \frac{P_a - P_n}{P_a} \quad (2)$$

For example, this formula states that at 50% loading (X=0.5), the total power received at the base station is twice that which is received at no loading.

Given the relationship shown in Equation 1, current base station loading X can be determined based upon a known no load power level and an actual measurement of the total power received at the base station. Note that the actual power measurement should be filtered with an appropriate time constant in view of the time constant at which the power control operation varies the transmit power of the remote unit. In addition, if the reverse link operates at variable data rates resulting in gated transmissions from the remote units, the actual power measurement should be filtered to average the effects of the gated transmissions on the instantaneous power measurement.

The dynamic range of the relative power measurement $(P_a/P_n)$ is not large in a typical system. For example, as the loading X increases from 0 to 90% of the pole capacity, the ratio of $(P_a/P_n)$ increases from 0 to 10 decibels (dB). Typically, base station loading X is limited to about 60–75% of the pole capacity. As X increases from 0.6 to 0.75, the ratio of $(P_a/P_n)$ increases from about 4 to about 6 dB. Therefore, to accurately limit the loading of the reverse link, the ratio of $(P_a/P_n)$ should be measured with less than 1 dB of error in order to avoid over- or under-estimation of the loading.

While this approach appears to be straightforward, in reality, it is difficult to achieve consistently required accuracy of the relative power measurements. For example, accurately measuring the noise floor (e.g., $P_n$) of a base station in an operating environment is difficult. In addition, even if an accurate measurement of the noise floor could be made at one time, the noise floor is sensitive to gain and noise figure variations due to temperature, aging and other phenomena, and, hence, the noise floor power level changes as a function of time. Without a means of accurate measurement, any admission control algorithm based upon Equation 2 will likely block connections when no blocking is necessary or admit connections resulting in potentially unsteady system behavior.

In addition to the no load power measurement, the actual power received at the base station must also be measured. The measurement of the absolute power level using power meters or automatic gain control circuits is extremely difficult within an accuracy of a few dB. In order to achieve this sort of accuracy in an absolute power measurement, the cost and size of the measurement apparatus becomes prohibitive.

In another improved method for determining cell loading, a system enters a period of silence. During the period of silence, a remote test unit generates a reverse link signal. A base station demodulates the reverse link signal and generates a series of closed loop power control commands for the remote unit. The remote unit responds to the power control commands by adjusting the level at which it transmits the reverse link signal. As the system operating point changes in response to the new operating conditions, the series of commands are accumulated to determine a transmit gain adjustment value corresponding to the period of silence, TGA(0). Once normal system operation is resumed, the base station demodulates the reverse link signal from the remote test unit and generates a series of power control commands for the remote unit. As the system operating point changes in response to the normal operating conditions once again, the series of power control commands are accumulated to determine a transmit gain adjustment value for the current system loading, TGA (t). Using TGA(0) and TGA(t), the system loading is determined. This method for determining cell loading is described in detail in U.S. Pat. No. 6,192,249, entitled "METHOD AND APPARATUS FOR LOADING ESTIMATION", assigned to the assignee of the present invention and incorporated by reference herein.

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in copending U.S. Pat. No. 08/886,604, entitled "HIGH DATA RATE CDMA WIRELESS COMMUNICATION SYSTEM", assigned to the assignee of the present invention and incorporated by reference herein.

SUMMARY OF THE INVENTION

The present invention is a novel and improved method and apparatus for estimating reverse link loading in a wireless communication system. In the present invention, the reverse link signals are passed through notch filters such that no energy (or energy of negligible amounts) is transmitted in these areas of the reverse link frequency band. At the base station, the unloaded cell energy is estimated by measuring the energy in the notched portions of the reverse link signals. The in-band energy is then compared to the energy in the notched portions of the reverse link band and based on this ratio cell capacity is determined.

Although not limited to, as one ordinarily skilled in the art recognizes, the present invention is ideally suited to spread spectrum communications systems wherein the information is spread over a large frequency band, because in spread spectrum communications systems a portion of the signal can be removed with minimal effects on the ability to reliably receive and decode the signal. In the exemplary embodiment, the reverse link signal is a code division multiple access signal spread over a 1.228 MHz frequency band, and the notch filters have a proposed bandwidth of about 30kHz.

Similarly, a frequency hopping system can employ this technique simply by using a hop selection algorithm that prevents hops into the band that would be notched out.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
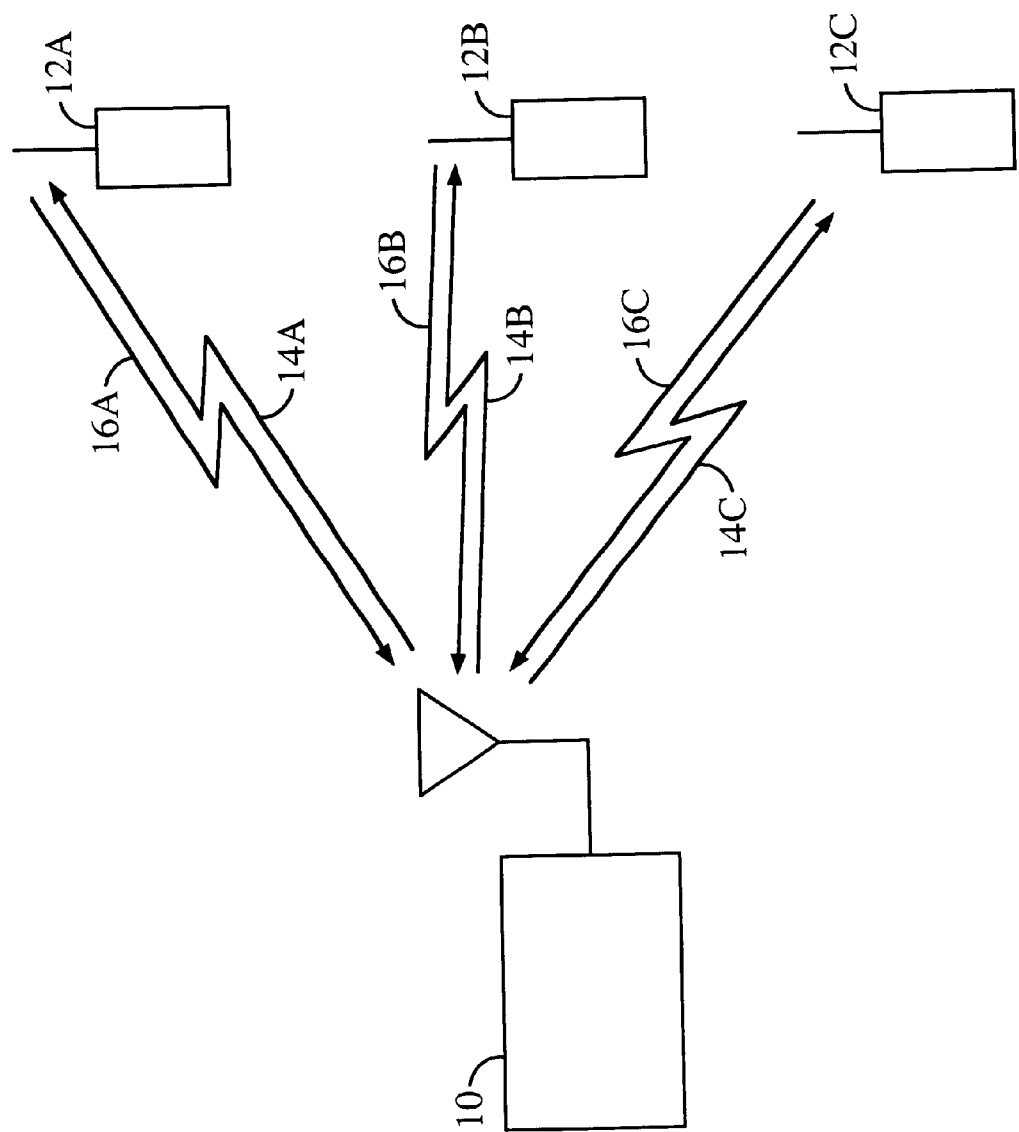
FIG. 1 is a diagram showing the elements of a wireless communication system.

FIG. 1 provides a highly simplified illustration of a wireless telephone system. Base station (BS) 10 communicates with a plurality of remote stations (RS) 12a–12c over an RF interface. The signals transmitted from base station 10 to remote stations 12 are referred to herein as forward link signals 14. The signals transmitted from remote stations 12 to base station 10 are referred to herein as reverse link signals 16.

Figure 2:
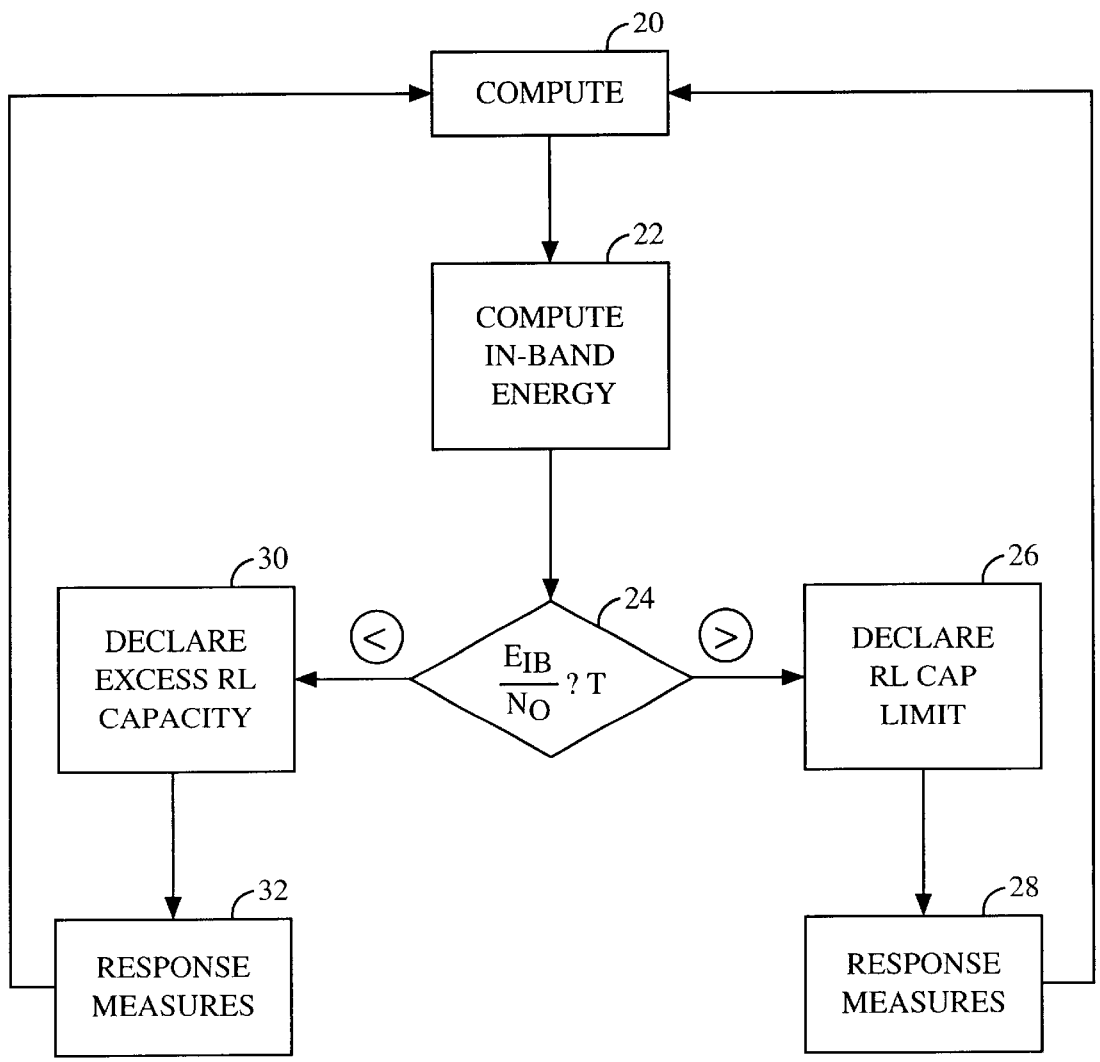
FIG. 2 is a flowchart illustrating the operation of estimating the reverse link loading and responding to the estimates.

FIG. 2 depicts a flowchart diagram illustrating basic steps of estimating the reverse link capacity limits of the present invention. One skilled in the art can appreciate that although the diagram is drawn in a sequential order for comprehension, in actual realization certain steps can be performed in parallel. In block 20 a noise floor equivalent of an unloaded cell $N_0$ is calculated. In the present invention, each of remote stations 12 transmit a reverse link signal 16, which is processed through a notch filter such that in the frequency band within the notch, the energy transmitted by the remote stations is negligible. Consequently, any energy in such frequency band is due to the noise floor of the base station.

In block 22 an in-band energy $I_O$ is calculated. In the preferred embodiment, the in-band energy is measured by computing the sum of the squares of the in-band digital samples. This measurement can also be performed by examining the scaling operation of the automatic gain control element of receiver in the base station. However, in cell wilting conditions, in which the base station injects noise into the received signal, the inband energy measurement must be performed in a manner that removes the effects of the injected noise prior to using the automatic gain control scaling as an indication of in band energy. Cell wilting is an operation in which a cell that has exceeded its loading thresholds modifies its operation to make the base station appear further away from remote stations in its coverage area. Cell wilting is well known in the art and is described in detail in U.S. Pat. No. 5,548,812, entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM", assigned to the assignee of the present invention and incorporated by reference herein.

In block 24 a ratio of the in-band energy to the noise floor, $I_O/N_0$, is compared to a threshold T. In the present invention, the ratio of the noise energy measured at the base station with the mobile stations transmitting to the noise energy measured at the base station without any mobile stations transmitting, is used to determine the loading condition.

If the ratio is greater than the threshold, a reverse link loading capacity limit is declared in block 26. An appropriate responsive measure is taken in block 28. In a first exemplary embodiment, in response to the cell loading declaration, base station 10 transmits a signal indicating that it has reached a reverse link loading limit on forward link signals 14. In response to this signal, the remote stations in the coverage area of base station 10 adjust the transmission of reverse link signals 14. The adjustment may be in the form of a data rate reduction or in the transmission energy of the signals or both. Alternatively, the remote stations 12 in the coverage area of base station 10 will inhibit the transmission of reverse link signals 14 when receiving the signal indicating that reverse link capacity limit has been reached.

An additional response measure that may be taken in response to the determination that base station 10 has reached a reverse link capacity limit is that the base station performs a wilting operation, which makes it appear further from mobile stations in its coverage area than it actually is. This wilting operation entails reducing energy of its forward link transmissions 14 and injecting noise into its reverse link receiver path as described in detail in the aforementioned U.S. Pat. No. 5,548,812.

If the ratio is less than the threshold, a reverse link loading capacity excess is declared in block 30. In this condition, the base station can provide service to additional mobile stations. An appropriate responsive measure is taken in block 32. In a first exemplary embodiment, in response to the determination that the cell has excess capacity, base station 10 transmits a signal indicating that it has additional reverse link capacity on forward link signals 14. In response to this signal, the remote stations in the coverage area of base station 10 adjust the transmission of reverse link signals 14. The adjustment may be in the form of a data rate increase or a transmission energy increase or both.

An additional measure that may be taken in response to the determination that base station 10 has reached a reverse link capacity limit is that the cell performs a cell blossoming operation. The blossoming operation is essentially the removal of the cell from a wilting operation mode.

Figure 3:
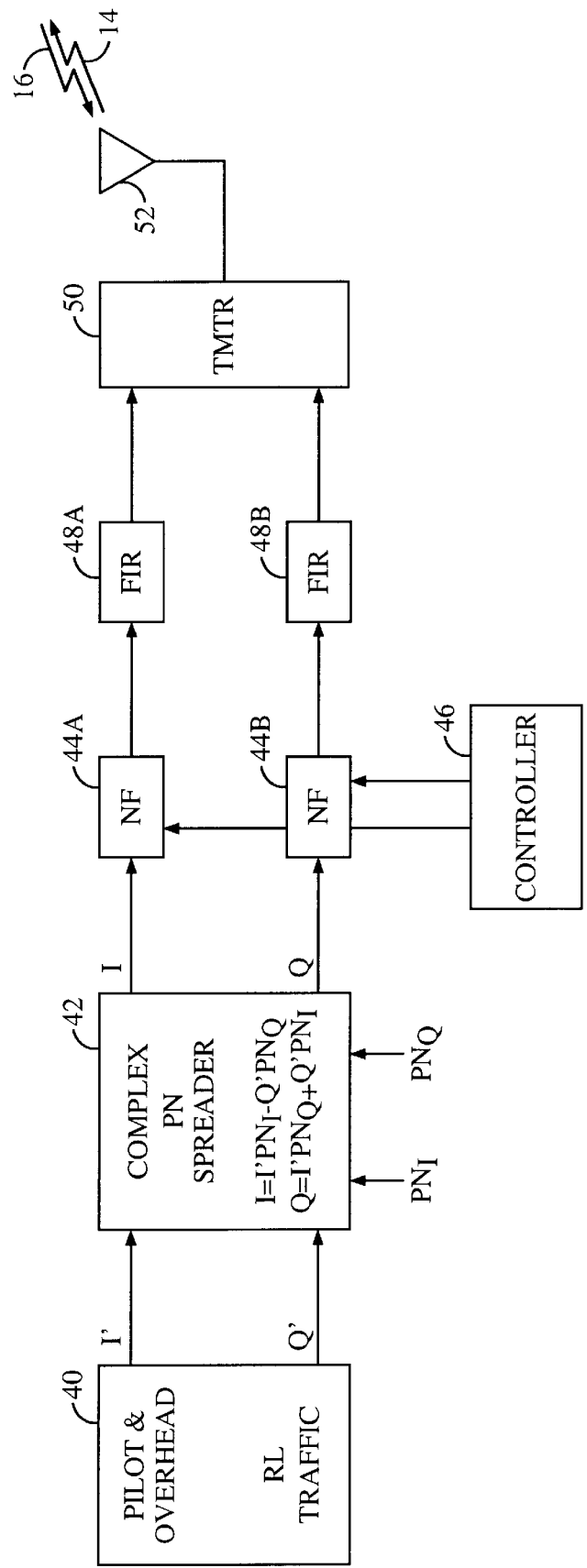
FIG. 3 is a block diagram of the remote station of the present invention.

FIG. 3 is a partial block diagram of a remote station 12. An in-phase component (I') and quadrature component (Q') of a signal 40 to be transmitted is provided to a complex pseudonoise (PN) spreader 42. It will be understood by one of ordinary skills in the art that processing of the signal 40 including forward error correction coding, interleaving, and rate matching are performed prior to the signal's provision to the a complex pseudo-noise spreader 42. In the exemplary embodiment, overhead information such as pilot symbols and power control bits are provided to the I' input of complex pseudonoise (PN) spreader 42, while traffic channel data is provided to the Q' input of complex pseudonoise (PN) spreader 42.

Figure 4A:
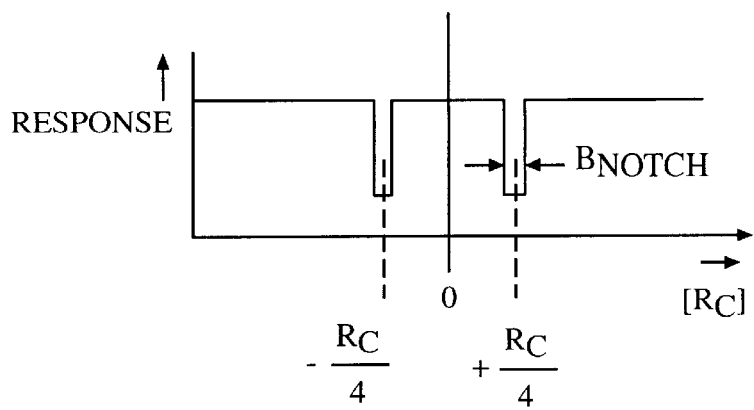
FIGS. 4A–4D are illustrations of the frequency response curves of the filters of the present invention.

In the exemplary embodiment, complex PN spreader 40 spreads the signals in accordance with two distinct PN sequences $PN_I$ and $PN_Q$. Complex PN spreading is well known in the art and is described in a co-pending U.S. patent application Ser. No. 08/886,604, entitled "HIGH DATA RATE CDMA WIRELESS COMMUNICATION SYSTEM" which is assigned to the assignee of the present invention and incorporated by reference herein. The in-phase component (I) and quadrature component (Q) of complex PN spread signals are provided to corresponding notch filters (NF) 44a and 44b. As described above the notch filters are provided so that remote stations do not transmit energy into a portion of the spectrum used for the transmission of reverse link signals 16. Energy in these notches provide the estimate of the unloaded energy of base station 10. FIG. 4a illustrates an exemplary frequency response for notch filters 44a and 44b. In a preferred embodiment, the positions of the notches are provided at $\pm R_C/4$ in the baseband, which will be upconverted to $f_c \pm R_C/4$, where $f_c$ is a carrier frequency, and $R_C$ is a chip rate. The particular location for the notches is preferred because it can be implemented with minimal computational complexity. It will be understood by one skilled in the art that the locations of the notches can be arbitrarily selected without departing from the scope of the present invention.

Controller 46 controls the frequency response characteristics of notch filters 44a and 44b. In a first embodiment, controller 46 provides no variation in the frequency response of notch filters 44a and 44b. The first embodiment, has the benefit of simplicity but suffers form the defect that the energy over the band may not be uniform and as such may provide a poor estimate of the unloaded in band energy. In a second embodiment, controller 46 sweep the location of the notch over the transmission band of reverse link signals 16. In a third embodiment, controller 46 hops the location of the notch of filters 44a and 44b. One of ordinary skills in the art will understand that the enumerated possibilities are by no means exhaustive, and are provided merely as examples of methods of providing samples of the inband unloaded noise energy across the transmission band to base station 10.

Figure 4C:
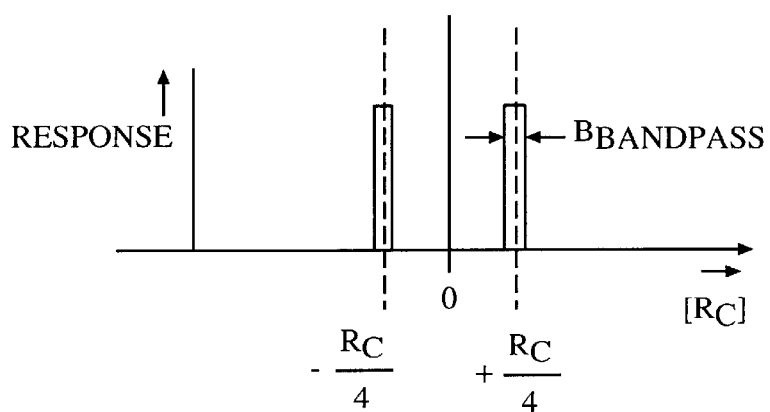
Figure 4B:
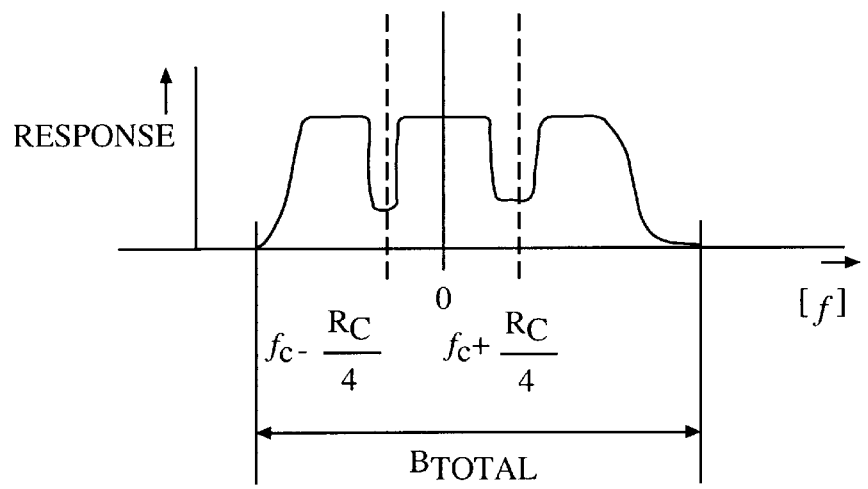

The notch filtered I and Q components are then provided to a pulse shaping filters (FIR) 48a and 48b. Pulse shaping filters 48a and 48b are provided to reduce out of band emissions. In the preferred embodiment, the notch filtering operation is performed at baseband prior to filtering in FIR filters 48a and 48b. The reason for notch filtering prior to the pulse shaping is that in the current systems the pulse shaping filters require a sampling rate higher than the baseband chip rate in order to reduce the out of band emissions of reverse link signals 16 to specified limits. It will be understood by one skilled in the art that notch filters 44a and 44b can be provided subsequent to pulse shaping filters 48a and 48b and can even be performed at the RF frequencies subsequent to up conversion in transmitter 50. FIG. 4b depicts the frequency characteristics of the signal output by pulse shaping filters 48a and 48b with notches at frequencies $f_c \pm R_c/4$.

Transmitter 50 up-converts, amplifies, and filters the signals in accordance with a chosen modulation format, and provides the processed signals to an antenna 52 for transmission over reverse link 16. In the exemplary embodiment, transmitter 50 upconverts the signals for transmission in accordance with a quaternary phase shift keyed modulation (QPSK). The present invention is equally applicable to other modulation schemes, such as BPSK and QAM modulation.

Figure 5:
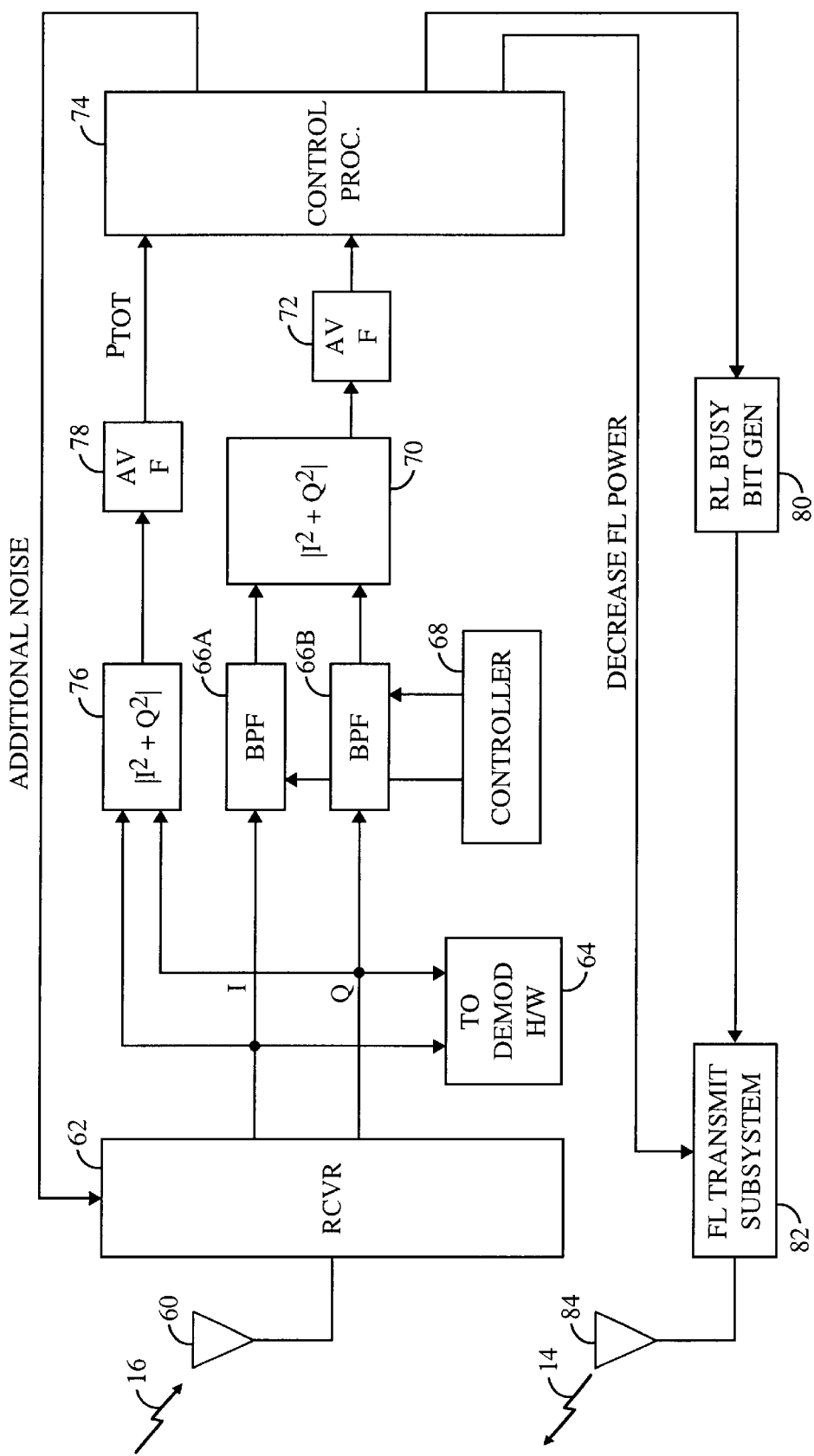
FIG. 5 is a block diagram of the base station of the present invention.

FIG. 5 is a partial block diagram of a base station 10. Reverse link signals 16 are received by an antenna 60, and provided to a receiver (RCVR) 62. Receiver 62 downconverts, amplifies, and filters the received signals. In the exemplary embodiment, the demodulation format is quaternary phase shift keying, though the present invention is equally applicable to other demodulation formats. The I and Q components of the received signal are then provided to a demodulation block 64, to band-pass filters (BPF) 66a and 66b, and to energy calculator 76.

Figure 4D:
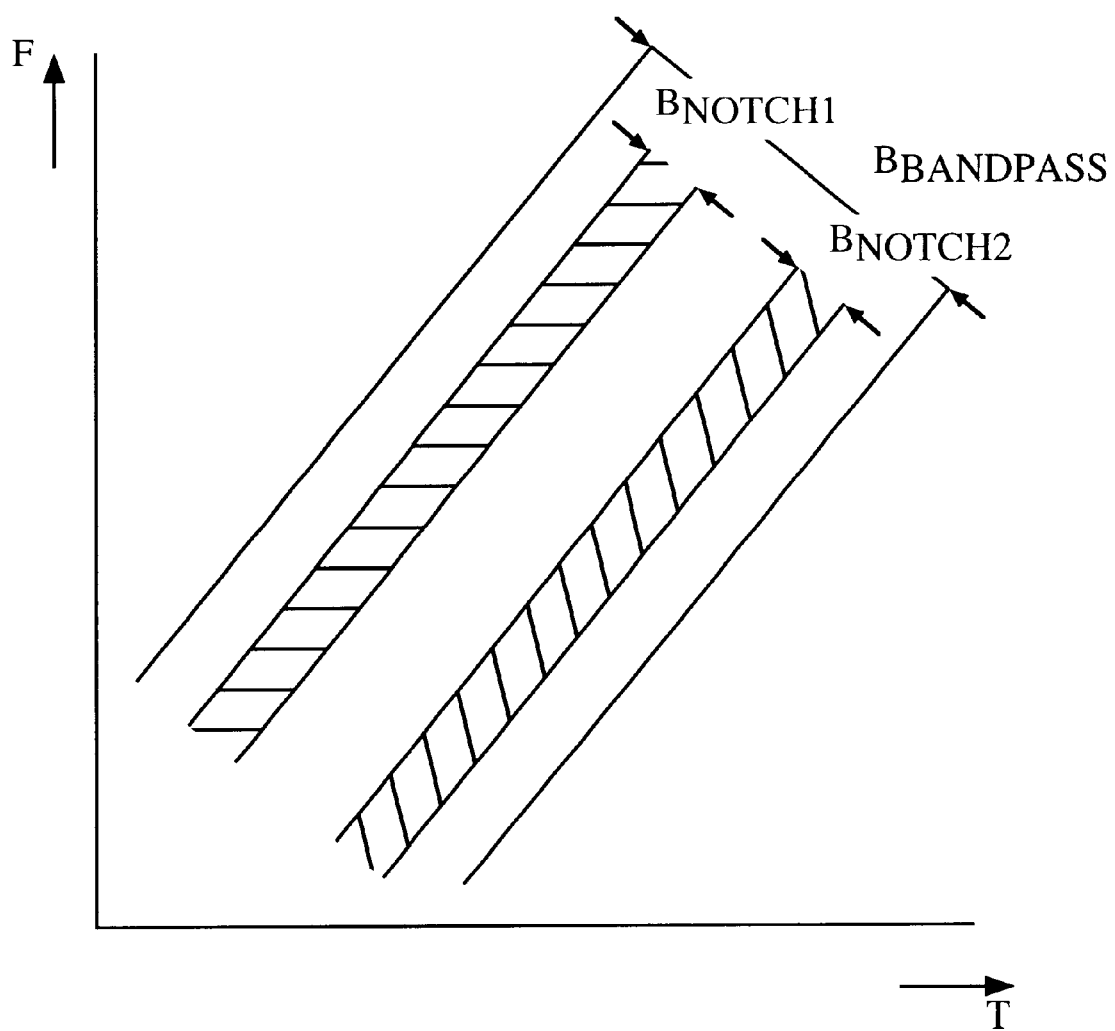

The characteristics of the notch filters 66a and 66b are controlled by a controller 68. The control signals of controller 68 mirrors the control signals of controller 46. Consequently, the characteristics of the notch-filters 44a and 44b are aligned with the characteristics of the band-pass filters 66a and 66b. Thus, the output of band pass filters 66a and 66b are portions of reverse link signals 16 that are filtered out by notch filters 44a and 44b. The frequency response of bandpass filters 66a and 66b are illustrated in FIG. 4c. It can be seen that the purpose of the bandpass filters is to direct the portion of the reverse link spectrum that was notched by filter 44 to energy calculator 70. FIG. 4d depicts an exemplary embodiment of the invention, in which two different sets of users notch two different portions of the spectrum used for transmission of reverse link signals. In such embodiment, the bandwidth of the filters 66a and 66b BBandpass must be wide enough to include bandwidths of the notches BNotch1 and BNotch2 of the users. One ordinarily skilled in the art can recognize that FIG. 4d uses two different sets of users only for the purpose of explanation, and can be extended to different number of users without departing from the spirit of the invention. Likewise, the linear sweep of frequency with time is not meant to limit the scope of the invention to this particular embodiment.

The outputs of the band-pass filters 66a and 66b are provided to energy calculator 70. In the exemplary embodiment, the filtered digital samples from band pass filters 66a and 66b are squared and then summed to provide an estimate of the energy in the notched frequency band portions of the reverse link transmissions from remote stations 12.

The sum of the squares are provided to filter 72. In the exemplary embodiment, filter 72 is a moving average filter that can be implemented in a variety of ways such as using a finite impulse response filter. The output of filter 72 is provided to a control processor 74 as an estimate of the noise energy in the frequencies notched out of the reverse link transmissions from remote stations 12.

In the computation of the in-band energy, the digitized samples from receivers 62 are provided to energy calculator 76. Energy calculator 76 estimates the total in-band energy ($I_O$) by summing the squares of the digitized samples and providing those values to filter 78. As described with respect to filter 72, in the exemplary embodiment, filter 78 is a moving average filter. The filtered energy samples are provided to control processor 74 as an estimate of the total in-band energy $I_O$.

The control processor 74 is further provided with an information about the bandwidth of the NF and BPF, and, a chip rate. Based on the bandwidth of reverse link transmissions 16 and the bandwidth of the notches of filters 44a and 44b, the control processor 74 then calculates an estimate of the reverse link loading (RLL) in accordance with a general equation:

$$RLL = \frac{I_o}{\left[I_{Notch} - 2I_o\left(\frac{B_{Bandpass} - B_{Notch}}{B_{Total}}\right)\right]} \frac{2B_{Notch}}{B_{Total}} \quad (3)$$

where $I_O$ is the estimated total in band energy determined in accordance with the output of filter 78, $I_{notch}$ is the estimated energy in the notched portions of reverse link signals 16, $B_{Total}$ is the total bandwidth of reverse link signals 16, $B_{Notch}$ is the bandwidth of the notches provided by filters 44a and 44b, and $B_{Bandpass}$ is the bandwidth of the filters 66a and 66b. The factor of 2 in the denominator of equation (3) is based on the fact that there are two notches in the reverse link signal spectrum and that the notches have equal bandwidth $B_{Notch}$.

This equation shall be utilized in an embodiment when different sets of users will notch different portions of the spectrum used for transmission of reverse link signals. In such embodiment, the bandwidth of the filters 66a and 66b must be wide enough to include bandwidths of the notches of all the users. In a different embodiment, where $B_{Bandpass}$ equals $B_{Notch}$, i.e., when all the users notch the same portion of the spectrum used for transmission of reverse link signals, the equation reduces to a form:

$$RLL = \frac{I_O}{I_{Notch}} \cdot \frac{2B_{Notch}}{B_{Total}}, \qquad (4)$$

One skilled in the art will appreciate that the present invention can be easily extended to an arbitrary number of notches and to notches of varying widths. In addition, it will be understood by one skilled in the art that the scaling of the ratio between the notched frequency portions and the in band energy need not be performed. Rather the threshold against which this ratio is compared may be scaled, reducing the computational complexity of the operation performed by control processor 74.

The reverse loading is then compared to a threshold (T). The control processor 74 then takes a responsive measure based on the result of the comparison.

If the reverse loading is greater than the threshold, a reverse link loading capacity limit is declared. In one embodiment of the invention, the control processor 74 responds by wilting the cell. A control command to decrease transmission power of forward link signals 14 is sent to forward link transmission subsystem 82. In response to this signal, the power amplifier (not shown) in the forward link transmission subsystem 82 reduces the gain of the transmissions. In addition, a corresponding signal to increase a noise floor of the receiver is sent to the receiver 62. In response to this signal noise is injected into the received reverse link signals. The result is that the base station appears to be further from mobile stations than it actually is which forces the mobile stations to move into a handoff to adjacent cells which have additional capacity.

If the reverse loading is less than the threshold, a reverse link loading capacity excess is declared. In one embodiment of the invention, the control processor 74 responds by blossoming the cell. A control command to increase transmission power is sent to forward link transmission subsystem 78, and corresponding signal to decrease a noise floor of the receiver is sent to the receiver 62.

In another embodiment, the result of the comparison is sent to a RL Busy Bit Generator 76. The RL Busy Bit Generator 76 generates a RL Busy Bit with a first value if the reverse loading is greater than the threshold, and a RL Busy Bit with a second value if the reverse loading is less than the threshold. The base station 10 can then take an appropriate action. In one embodiment, the base station 10 can decrease the allowable number of users if the reverse link loading has been exceeded, and increase the allowable number of users if the reverse link loading is below allowable limit. In another embodiment, the base station 10 can decrease the allowable data rate for at least one user if the reverse link loading has been exceeded, and increase the allowable data rate for at least one user if the reverse link loading is below allowable limit.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for estimating a reverse link loading in a wireless communication system comprising the steps of:

(a) transmitting from a remote station a signal containing negligible energy in at least a first portion of a reverse link frequency band;

(b) measuring, at a base station, a first energy in a second portion of said reverse link frequency band, said second portion containing said first portion;

(c) measuring, at said base station, a second energy in said reverse link frequency band; and (d) computing, at said base station, said reverse link loading utilizing said first energy and said second energy.

2. The method in accordance with claim 1 wherein a position of said portion within said reverse link frequency band is invariable with time.

3. The method in accordance with claim 1 wherein a position of said portion within said reverse link frequency band is variable with time.

4. The method in accordance with claim 3 wherein said variation with time is continuous in time.

5. The method in accordance with claim 3 wherein said variation with time is discontinuous in time.

6. The method in accordance with claim 1 wherein the step of transmitting from a remote station a signal comprises the steps of:

(a) generating, at said remote station, said signal to be transmitted;

(b) filtering, at said remote station, said signal by a notch filter; and (c) transmitting from said remote station said filtered signal.

7. The method in accordance with claim 1 wherein the step of measuring, at a base station, a first energy comprises the steps of:

(a) filtering, at said base station, said reverse link frequency band by a band-pass filter; and (b) measuring, at said base station, said first energy of said filtered reverse link frequency band.

8. The method in accordance with claim 1 wherein the step of computing, said reverse link loading proceeds in accordance with an equation:

$$RLL = \frac{I_o}{\left[I_{Notch} - 2I_O\left(\frac{B_{Bandpass} - B_{Notch}}{B_{Total}}\right)\right]} \frac{2B_{Notch}}{B_{Total}}$$

wherein:

(i) $I_O$ is said second energy;

(ii) $I_{Notch}$ is said first energy;

(iii) $B_{Total}$ is said reverse link frequency band;

(iv) $B_{Notch}$ is said first portion of said reverse link frequency band; and (v) $B_{Bandpass}$ is said second portion of said reverse link frequency band.

9. The method in accordance with claim 1 wherein the step of computing, said reverse link loading proceeds in accordance with an equation:

$$RLL = \frac{I_O}{I_{Notch}} \cdot \frac{2B_{Notch}}{B_{Total}}$$

wherein:
(i) $I_O$ is said second energy;
(ii) $M_{Notch}$ is said first energy;
(iii) $B_{Total}$ is said reverse link frequency band; and
(iv) $B_{Notch}$ is said first portion of said reverse link frequency band.

10. The method in accordance with claim 1 wherein said wireless communication system is a spread spectrum wireless system.

11. The method in accordance with claim 10 wherein said spread spectrum wireless communication system is a direct sequence spread spectrum wireless system.

12. The method in accordance with claim 10 wherein said spread spectrum wireless communication system is a frequency hopped spread spectrum wireless system.

13. A Method for producing, at a remote station, a signal to be used for estimating a reverse link loading comprising the steps of:
(a) generating, at said remote station, a signal to be transmitted; and
(b) filtering, at said remote station, said signal by a notch filter, wherein a position of said notch within a reverse link frequency band is invariable with time.

14. A method for producing, at a remote station, a signal to be used for estimating a reverse link loading comprising the steps of:
(a) generating, at said remote station, a signal to be transmitted; and
(b) filtering, at said remote station, said signal by a notch filter, wherein a position of said notch within a reverse link frequency band is variable with time.

15. The method in accordance with claim 14 wherein said variation with time is continuous in time.

16. The method in accordance with claim 14 wherein said variation with time is discontinuous in time.

17. A method for estimating a reverse link loading by a base station comprising the steps of:
(a) receiving, at said base station, a reverse link signal containing negligible energy in at least a first portion of a reverse link frequency band
(b) measuring, at said base station, a first energy in a second portion of said reverse link frequency band, said second portion containing said first portion;
(c) measuring, at said base station, a second energy in said reverse link frequency band; and
(d) computing, at said base station, said reverse link loading utilizing said first energy and said second energy.

18. The method in accordance with claim 17 wherein the step of measuring, at a base station, a first energy comprises the steps of:
(a) filtering, at said base station, said reverse link frequency band by a band-pass filter; and
(b) measuring, at said base station, said first energy of said filtered reverse link frequency band.

19. The method in accordance with claim 17 wherein the step of computing, said reverse link loading proceeds in accordance with an equation:

$$RLL = \frac{I_o}{\left[I_{Notch} - 2I_O\left(\frac{B_{Bandpass} - B_{Notch}}{B_{Total}}\right)\right]} \cdot \frac{2B_{Notch}}{B_{Total}}$$

wherein:
(i) $I_O$ is said second energy;
(ii) $I_{Notch}$ is said first energy;
(iii) $B_{Total}$ is said reverse link frequency band;
(iv) $B_{Notch}$ is said first portion of said reverse link frequency band; and
(v) $B_{Bandpass}$ is said second portion of said reverse link frequency band.

20. The method in accordance with claim 17 wherein the step of computing, said reverse link loading proceeds in accordance with an equation:

$$RLL = \frac{I_O}{I_{Notch}} \cdot \frac{2B_{Notch}}{B_{Total}}$$

wherein:
(i) $I_O$ is said second energy;
(ii) $I_{Notch}$ is said first energy;
(iii) $B_{Total}$ is said reverse link frequency band; and
(iv) $B_{Notch}$ is said first portion of said reverse link frequency band.

21. An apparatus for estimating a reverse link loading in a wireless communication system comprising:
(a) means for transmitting from a remote station a signal containing negligible energy in at least a first portion of a reverse link frequency band;
(b) means for measuring, at a base station, a first energy in a second portion of said reverse link frequency band, said second portion containing said first portion;
(c) means for measuring, at said base station, a second energy in said reverse link frequency band; and
(d) means for computing, at said base station, said reverse link loading utilizing said first energy and said second energy.

22. The apparatus in accordance with claim 21 wherein a position of said portion within said reverse link frequency band is invariable with time.

23. The apparatus in accordance with claim 21 wherein a position of said portion within said reverse link frequency band is variable with time.

24. The apparatus in accordance with claim 23 wherein said variation with time is continuous in time.

25. The apparatus in accordance with claim 23 wherein said variation with time is discontinuous in time.

26. The apparatus in accordance with claim 21 wherein the means for transmitting from a remote station a signal comprises:
(a) means for generating, at said remote station, said signal to be transmitted;
(b) means for filtering, at said remote station, said signal by a notch filter; and
(c) means for transmitting from said remote station said filtered signal.

27. The apparatus in accordance with claim 21 wherein the means for measuring, at a base station, a first energy comprise:

(a) means for filtering, at said base station, said reverse link frequency band by a band-pass filter; and
(b) means for measuring, at said base station, said first energy of said filtered reverse link frequency band.

28. The apparatus in accordance with claim 21 wherein the means for computing, said reverse link loading evaluate an equation:

$$RLL = \frac{I_O}{\left[I_{Notch} - 2I_O\left(\frac{B_{Bandpass} - B_{Notch}}{B_{Total}}\right)\right]} \cdot \frac{2B_{Notch}}{B_{Total}}$$

wherein:
(i) $I_O$ is said second energy;
(ii) $I_{Notch}$ is said first energy;
(iii) $B_{Total}$ is said reverse link frequency band;
(iv) $B_{Notch}$ is said first portion of said reverse link frequency band; and
(v) $B_{Bandpass}$ is said second portion of said reverse link frequency band.

29. The apparatus in accordance with claim 21 wherein the means for computing, said reverse link loading evaluate an equation:

$$RLL = \frac{I_O}{I_{Notch}} \cdot \frac{2B_{Notch}}{B_{Total}}$$

wherein:
(i) $I_O$ is said second energy;
(ii) $I_{Notch}$ is said first energy;
(iii) $B_{Total}$ is said reverse link frequency band; and
(iv) $B_{Notch}$ is said first portion of said reverse link frequency band.

30. The apparatus in accordance with claim 21 wherein said wireless communication system is a spread spectrum wireless system.

31. The apparatus in accordance with claim 21 wherein said spread spectrum wireless communication system is a direct sequence spread spectrum wireless system.

32. The apparatus in accordance with claim 21 wherein said spread spectrum wireless communication system is a frequency hopped spread spectrum wireless system.

33. An apparatus for estimating a reverse link loading in a wireless communication system comprising:
(a) means for generating, at a remote station, a signal to be transmitted;
(b) means for filtering, at said remote station, said signal by a notch filter, wherein a position of said notch within said reverse link frequency band is invariable with time; and
(c) means for transmitting from said remote station said filtered signal.

34. An apparatus for estimating a reverse link loading in a wireless communication system comprising:
(d) means for generating, at a remote station, a signal to be transmitted;
(e) means for filtering, at said remote station, said signal by a notch filter, wherein a position of said notch within said reverse link frequency band is variable with time; and
(f) means for transmitting from said remote station said filtered signal.

35. The apparatus in accordance with claim 34 wherein said variation with time is continuous in time.

36. The apparatus in accordance with claim 34 wherein said variation with time is discontinuous in time.

37. A apparatus for estimating a reverse link loading by a base station comprising:
(a) means for receiving, at said base station, a reverse link signal containing negligible energy in at least a first portion of a reverse link frequency band;
(b) means for measuring, at said base station, a first energy in a second portion of said reverse link frequency band, said second portion containing said first portion;
(c) measuring, at said base station, a second energy in said reverse link frequency band; and
(d) computing, at said base station, said reverse link loading utilizing said first energy and said second energy.

38. The apparatus in accordance with claim 37 wherein the means for measuring a first energy comprises:
(a) means for filtering, at said base station, said reverse link frequency band by a band-pass filter; and
(b) means for measuring, at said base station, said first energy of said filtered reverse link frequency band.

39. The apparatus in accordance with claim 37 wherein the means for computing said reverse link loading proceeds in accordance with an equation:

$$RLL = \frac{I_O}{\left[I_{Notch} - 2I_O\left(\frac{B_{Bandpass} - B_{Notch}}{B_{Total}}\right)\right]} \cdot \frac{2B_{Notch}}{B_{Total}}$$

wherein:
(i) $I_O$ is said second energy;
(ii) $I_{Notch}$ is said first energy;
(iii) $B_{Total}$ is said reverse link frequency band;
(iv) $B_{Notch}$ is said first portion of said reverse link frequency band; and
(v) $B_{Bandpass}$ is said second portion of said reverse link frequency band.

40. The apparatus in accordance with claim 37 wherein the means for computing said reverse link loading proceeds in accordance with an equation:

$$RLL = \frac{I_O}{I_{Notch}} \cdot \frac{2B_{Notch}}{B_{Total}}$$

wherein:
(i) $I_O$ is said second energy;
(ii) $I_{Notch}$ is said first energy;
(iii) $B_{Total}$ is said reverse link frequency band; and
(iv) $B_{Notch}$ is said first portion of said reverse link frequency band.

41. An apparatus for estimating a reverse link loading in a wireless communication system comprising:
(a) a remote station comprising:
(1) a signal source;
(2) a first filter, communicatively coupled to said signal source, said first filter passing negligible energy in at least a first portion of a frequency band; and
(3) a transmitter, communicatively coupled to said first filter, said transmitter transmitting said filtered signal; and
(b) a base station comprising:
(1) a receiver for receiving said signal from said remote station;

(2) a second filter, communicatively coupled to said receiver, said second filter passing energy in second portion of said frequency band, said second portion containing said first portion;

(3) a first processor, communicatively coupled to said second filter, said first processor being configured to evaluate a first energy of a signal filtered by said second filter;

(4) a second processor, communicatively coupled to said receiver, said second processor being configured to evaluate a second energy of said received signal; and (5) a third processor, communicatively coupled to said first and said second processors, said third processor being configured to compute said reverse link loading using said first energy and said second energy.

42. The apparatus in accordance with claim 41 wherein a position of said portion within said reverse link frequency band is invariable with time.

43. The apparatus in accordance with claim 41 wherein a position of said portion within said reverse link frequency band is variable with time.

44. The apparatus in accordance with claim 43 wherein said variation with time is continuous in time.

45. The apparatus in accordance with claim 43 wherein said variation with time is discontinuous in time.

46. The apparatus in accordance with claim 41 wherein said third processor is configured to compute said reverse link loading by evaluating an equation:

$$RLL = \frac{I_o}{\left[I_{Notch} - 2I_o\left(\frac{B_{Bandpass} - B_{Notch}}{B_{Total}}\right)\right]} \cdot \frac{2B_{Notch}}{B_{Total}}$$

wherein:

(i) $I_O$ is said second energy;
(ii) $I_{Notch}$ is said first energy;
(iii) $B_{Total}$ is said reverse link frequency band;
(iv) $B_{Notch}$ is said first portion of said reverse link frequency band; and
(v) $B_{Bandpass}$ is said second portion of said reverse link frequency band.

47. The apparatus in accordance with claim 41 wherein said third processor is configured to compute said reverse link loading by evaluating an equation:

$$RLL = \frac{I_o}{I_{Notch}} \cdot \frac{2B_{Notch}}{B_{Total}}$$

wherein:

(i) $I_O$ is said second energy;
(ii) $I_{Notch}$ is said first energy;
(iii) $B_{Total}$ is said reverse link frequency band; and
(iv) $B_{Notch}$ is said first portion of said reverse link frequency band.

48. The apparatus in accordance with claim 41 wherein said wireless communication system is a spread spectrum wireless system.

49. The apparatus in accordance with claim 41 wherein said spread spectrum wireless communication system is a direct sequence spread spectrum wireless system.

50. The apparatus in accordance with claim 41 wherein said spread spectrum wireless communication system is a frequency hopped spread spectrum wireless system.

51. An apparatus for estimating a reverse link loading in a wireless communication system comprising:

(a) a signal source;

(b) a first filter, communicatively coupled to said signal source, said filter passing negligible energy in at least a portion of a frequency band, wherein a position of said portion within said frequency band is invariable with time; and (c) a transmitter, communicatively coupled to said first filter, said transmitter transmitting said filtered signal.

52. An apparatus for estimating a reverse link loading in a wireless communication system comprising:

(d) a signal source;

(e) a first filter, communicatively coupled to said signal source, said filter passing negligible energy in at least a portion of a frequency band, wherein a position of said portion within said frequency band is variable with time; and (f) a transmitter, communicatively coupled to said first filter, said transmitted transmitting said filtered signal.

53. The apparatus in accordance with claim 52 wherein said variation with time is continuous in time.

54. The apparatus in accordance with claim 52 wherein said variation with time is discontinuous in time.

55. An apparatus for estimating a reverse link loading in a wireless communication system comprising:

(a) a receiver for receiving a signal from a remote station, said signal containing negligible energy in at least a first portion of said reverse link frequency band;

(b) a filter, communicatively coupled to said receiver, said filter passing energy in a second portion of received frequency band, said second portion containing said first portion;

(c) a first processor, communicatively coupled to said filter, said first processor being configured to evaluate a first energy of a signal filtered by said filter;

(d) a second processor, communicatively coupled to said receiver, said second processor being configured to evaluate a second energy of said received signal; and (e) a third processor, communicatively coupled to said first and said second processors, said third processor being configured to compute said reverse link loading utilizing said first energy and said second energy.

56. The apparatus in accordance with claim 55 wherein said third processor is configured to compute said reverse link loading by evaluating an equation:

$$RLL = \frac{I_o}{\left[I_{Notch} - 2I_o\left(\frac{B_{Bandpass} - B_{Notch}}{B_{Total}}\right)\right]} \cdot \frac{2B_{Notch}}{B_{Total}}$$

wherein:

(i) $I_O$ is said second energy;
(ii) $I_{Notch}$ is said first energy;
(iii) $B_{Total}$ is said reverse link frequency band;
(iv) $B_{Notch}$ is said first portion of said reverse link frequency band; and in (v) $B_{Bandpass}$ is said second portion of said reverse link frequency band.

57. The apparatus in accordance with claim 55 wherein said third processor is configured to compute said reverse link loading by evaluating an equation:

$$RLL = \frac{I_o}{I_{Notch}} \cdot \frac{2B_{Notch}}{B_{Total}}$$

wherein:

(i) $I_O$ is said second energy;

(ii) $I_{Notch}$ is said first energy;

(iii) $B_{Total}$ is said reverse link frequency band; and (iv) $B_{Notch}$ is said first portion of said reverse link frequency band.

* * * * *